(12) United States Patent
Nickel-Jetter et al.

(10) Patent No.: US 7,548,003 B2
(45) Date of Patent: Jun. 16, 2009

(54) EXTERNAL-ROTOR MOTOR HAVING A STATIONARY BEARING SHAFT

(75) Inventors: Matthis Nickel-Jetter, Villingen-Schwennigen (DE); Hermann Rappenecker, Vöhrenbach (DE); Siegfried Schreiner, Villingen-Schwenningen (DE)

(73) Assignee: EMB-PAPST St.Georgen GmbH & Co. KG, St. Georgen (DE)

( * ) Notice: Subject to any disclaimer, the term of this patent is extended or adjusted under 35 U.S.C. 154(b) by 326 days.

(21) Appl. No.: 11/276,351

(22) Filed: Feb. 24, 2006

(65) Prior Publication Data

US 2007/0278868 A1 Dec. 6, 2007

Related U.S. Application Data

(62) Division of application No. 10/733,117, filed on Dec. 11, 2003, now Pat. No. 7,049,718.

(30) Foreign Application Priority Data

Dec. 16, 2002 (DE) ................... 102 58 593

(51) Int. Cl.
   *H02K 7/08* (2006.01)
(52) U.S. Cl. ......................................... 310/90
(58) Field of Classification Search ............. 310/90, 310/91, 89
   See application file for complete search history.

(56) References Cited

U.S. PATENT DOCUMENTS

| 4,121,127 A | * | 10/1978 | Adelski et al. | ............ 310/67 R |
| 4,651,241 A | | 3/1987 | von der Heide et al. | ........ 360/97 |
| 4,980,587 A | | 12/1990 | Yonei et al. | ................ 310/67 R |
| 5,128,571 A | | 7/1992 | Itsu | ........................... 310/67 R |
| 5,598,047 A | * | 1/1997 | Sakuragi et al. | ............ 310/67 R |
| 5,744,888 A | | 4/1998 | Zajc et al. | .................... 310/185 |
| 5,798,589 A | | 8/1998 | Ohi et al. | ....................... 310/90 |
| 5,918,728 A | | 7/1999 | Syverson | ..................... 198/788 |

(Continued)

FOREIGN PATENT DOCUMENTS

DE         0 460 383       9/1925

(Continued)

OTHER PUBLICATIONS

Sparks Belting Co. of Mich., "Dura-Drive conveyor belt motors," retrieved Nov. 2008 from WWW.SPARKSBELTING.COM/MOTORIZED-PULLEYS.HTML via Internet.

(Continued)

*Primary Examiner*—Nguyen N Hanh
(74) *Attorney, Agent, or Firm*—Milton Oliver; Oliver Intellectual Property LLC

(57) ABSTRACT

An improved drum motor, preferably electronically commutated, features a unitary stationary central shaft (18) supporting a stationary inner stator (52), and an external rotor (49), including permanent magnets (54), secured to an inner surface of a generally cylindrical rotatable casing part (18). This permits variable speed operation while avoiding any need for an internal gear linkage. Safety is improved by making sealing plates (76, 78) at respective axial ends of the casing (14) stationary, and providing an annular peripheral seal (90) around each sealing plate. Respective rolling bearings (24, 44) near each end of the casing (14) facilitate rotation of the external rotor (49) relative to the stator (52), and a clamping arrangement (30) minimizes noise from the bearings.

17 Claims, 2 Drawing Sheets

U.S. PATENT DOCUMENTS

Figure 1:
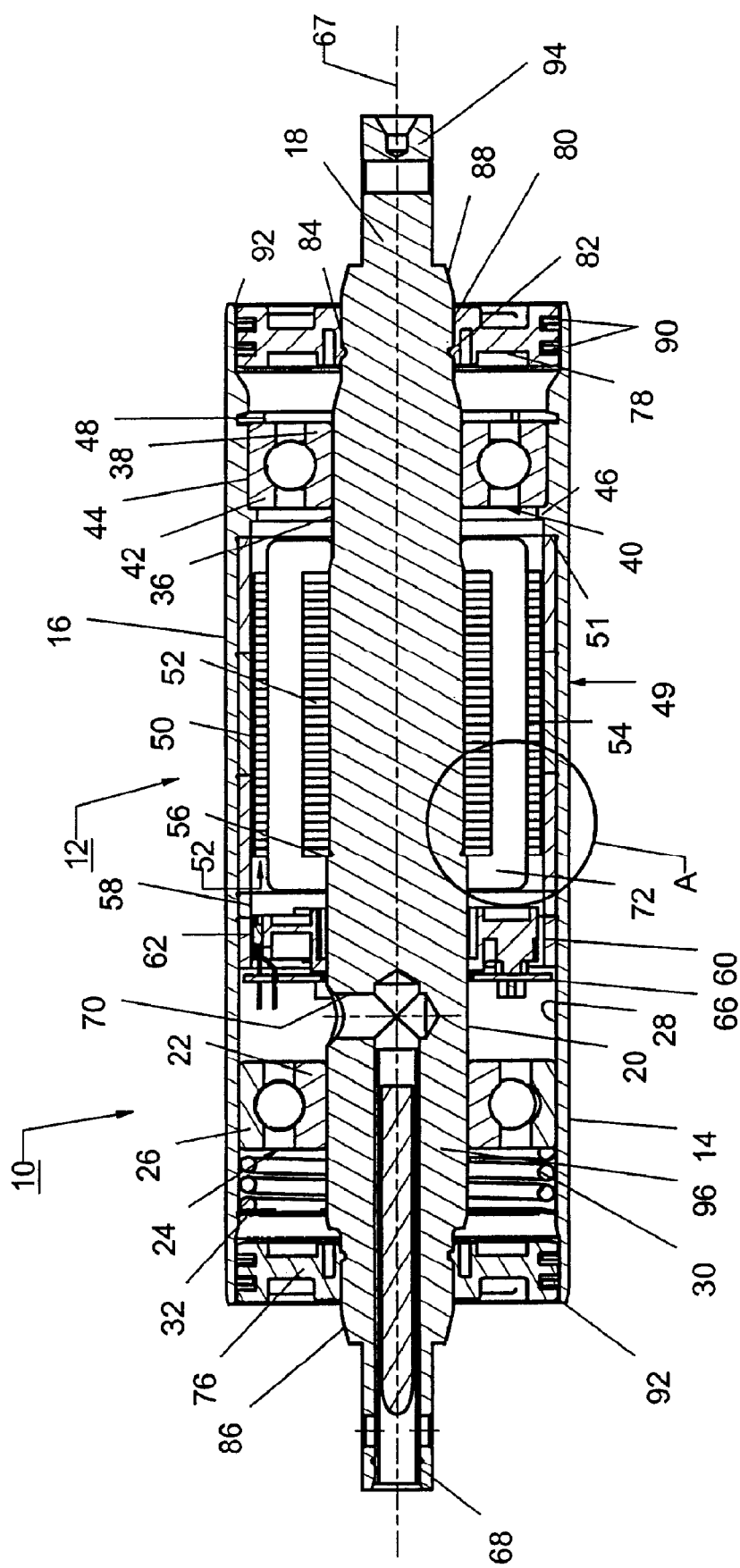

| | | | |
|---|---|---|---|
| 5,945,751 A | 8/1999 | Hans et al. | 310/67 R |
| 6,012,723 A | 1/2000 | Beeck | 277/355 |
| 6,166,468 A * | 12/2000 | Suzuki et al. | 310/90 |
| 6,244,427 B1 * | 6/2001 | Syverson | 198/788 |
| 6,455,960 B1 * | 9/2002 | Trago et al. | 310/64 |
| 6,592,678 B1 | 7/2003 | Kamikawa et al. | 134/18 |

FOREIGN PATENT DOCUMENTS

| | | |
|---|---|---|
| DE | 33 48 495 | 3/1984 |
| DE | 41 21 428 | 1/1993 |
| DE | 295 04 640 U1 | 6/1995 |
| DE | 195 03 610 | 8/1996 |
| DE | 296 11 097 U1 | 10/1996 |
| DE | 195 23 789 | 1/1997 |
| DE | 297 17 062 U1 | 2/1998 |
| DE | 196 40 979 | 4/1998 |
| DE | 198 00 989 A1 | 7/1999 |
| DE | 299 03 942 U1 | 7/1999 |
| DE | 296 23 889 U1 | 6/2000 |

OTHER PUBLICATIONS

BDL Maschinenbau GmbH, Wassenberg, Germany, "General Descr. of Drum Motors," retrieved Nov. 2008 from WWW.Interroll.COM/en/Products, via Internet.

* cited by examiner

EXTERNAL-ROTOR MOTOR HAVING A STATIONARY BEARING SHAFT

This application is a divisional of application Ser. No. 10/733,117, NICKEL-JETTER et al., filed 11 Dec. 2003, now U.S. Pat. No. 7,049,718 now allowed.

FIELD OF THE INVENTION

The present invention relates generally to an external rotor motor having a stationary bearing shaft, and more particularly to a drum motor.

BACKGROUND

German Utility Model DE 296 23 889 U1, JOERISSEN, discloses a so-called drum motor that is used in a variety of industries, for example to drive conveyor belts. In that document, the drum tube is secured at both ends to a respective cover, that therefore rotates together with the drum tube, and is driven via a gear linkage by a motor in the interior of the drum tube. To permit better cleaning, a cap made of stainless steel is adhesively bonded onto each cover.

SUMMARY OF THE INVENTION

It is an object of the invention to provide an improved motor of the general type just described.

According to the invention, this object is achieved by replacing the gear drive with a stationary central stator which cooperates with a permanent magnet external rotor on an inner surface of a casing part rotatable relative to the stator.

It is thereby possible to drive the casing part directly by means of the external rotor motor that is used, thus resulting in a simple design and eliminating the need to use a gear linkage. Electronic commutation proves very advantageous in this context, because it permits not only drive operation at high rotation speeds but also drive operation at very low rotation speeds—thus eliminating the need for an adjustable gear linkage—and because, in such a motor, the rotation speed is easily modifiable, e.g. by modifying the operating voltage.

A further advantageous feature of the invention is to make the axial end covers of the drum tube stationary, and to provide an annular seal with respect to the adjacent drum tube ends. A closure member of this kind is joined to the stationary support part, i.e. does not rotate, thus reducing the risk of injury at this point and also simplifying and facilitating cleaning, e.g. in the food industry or the pharmaceutical industry.

BRIEF FIGURE DESCRIPTION

Further details and advantageous features of the invention are evident from the exemplary embodiment described below, which is in no way to be understood as a limitation of the invention.

Figure 2:
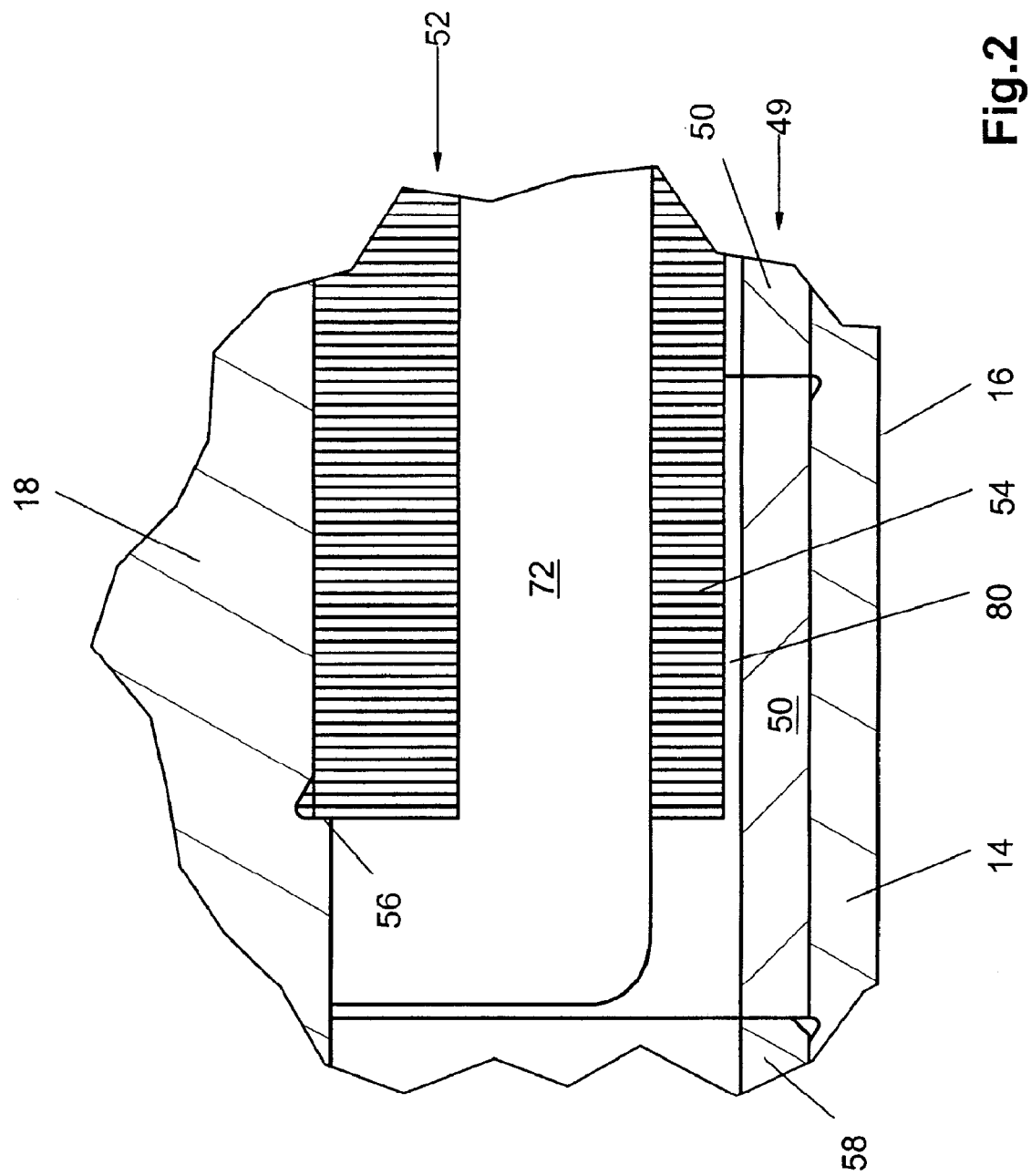

FIG. 1 is a longitudinal section through a preferred embodiment of an electronically commutated external rotor motor according to the invention; and FIG. 2 is an enlargement of detail A of FIG. 1, showing the relative positions of stationary stator and external rotor.

DETAILED DESCRIPTION

In the description that follows, terms such as "left" and "right" refer to the respective figure of the drawings.

FIG. 1 shows a so-called "drum motor" 10 that is driven directly by an electronically commutated external rotor motor 12 and preferably is adapted to drive conveyor belts. It has an external tubular casing part 14 made of ferromagnetic material, preferably steel, that can be of slightly convex configuration on its outer side 16.

External rotor motor 10 has a stationary support part 18 that, because of its appearance, is often referred to informally as a "shaft." This shaft 18 is stationary during operation, i.e. does not rotate.

This stationary shaft 18 has a cylindrical segment 20, of greater diameter, on which is mounted inner race 22 of a ball bearing 24, whose outer race 26 is arranged displaceably inside a cylindrical inner surface 28 of casing part 14 and is acted upon, toward the right, by a compression spring 30 whose left end is braced against a prong ring 32 or other abutment. A prong ring has, on its external periphery, one or more prongs which, upon assembly, dig into the cylindrical inner surface 28 of casing part 14, the result being that prong ring 32 constitutes an abutment for compression spring 30, so that the latter can clamp ball bearing 24, which contributes to noise reduction.

Shaft 18 furthermore has a cylindrical segment 36 of smaller diameter, on which is mounted inner race 38 of a ball bearing 40, whose outer race 42 is arranged on a cylindrical portion 44 of casing part 14 and is secured there on the left by a shoulder 46 and on the right by a snap ring 48. The two ball bearings 24, 40 therefore have different sizes, and they support casing part 14 rotatably on shaft 18.

Mounted in the cylindrical inner recess 28 of casing part 14 are permanent magnets 50 of external rotor motor 12, which define an external rotor 49. This is then magnet arrangement 50 of the motor part, which extends to the left from a shoulder 51 and coacts with an internal stator 52 whose lamination stack 54 is pressed onto shaft 18, which preferably is likewise made of ferromagnetic material and thus forms part of the magnetic circuit of internal stator 52. Shaft 18 is equipped with a shoulder 56 that defines the location of the lamination stack.

Adjoining permanent-magnet arrangement 50 to the left is a nonmagnetic spacer ring 58, made e.g. of brass, and this is followed to the left by a magnet ring 60 that serves to control one or more galvanomagnetic sensors 62, e.g. to control Hall generators (not depicted). The function of sensors 62 is to sense the rotational position of casing part 14 relative to stationary axis 18, which must occur very precisely, especially when motor 12 is running slowly and a rotation speed control system is being used.

Magnets 50, 60 are preferably magnetized in the radial direction. Magnet arrangement 50 can be implemented with, for example, four poles, and magnet ring 60 preferably has a greater number of poles, so that the rotational position can be sensed as accurately as possible.

Sensor 62 is mounted on a circuit board 66, which in turn is mounted on shaft 18 and carries electronic components of the electronically commutated external rotor motor 12, and extends approximately perpendicular to rotation axis 67 of casing part 14. For passage of a connection to circuit board 66, shaft 18 has an axial bore 68 and a radial bore 70 intersecting it. The winding of motor 12 is indicated at 72.

Two sealing plates 76, 78 are provided to seal the interior of drum motor 10. These are of identical configuration, so a description of right sealing plate 78 will suffice. The latter has, on its radially inner side, a portion 80 that can deflect radially outward and is equipped with an inwardly projecting catch ridge 82 that, in the assembled state, engages into an annular groove 84 of shaft 18 that is approximately complementary to it.

Shaft 18 is formed, in a region to the left of sealing plate 76, with a frusto-conical segment 86 to facilitate assembly of sealing plate 76, and with a frusto-conical segment 88 to facilitate assembly of sealing plate 78. This makes it easier to splay, and slide on, sealing plates 76, 78 during final assembly. It is very advantageous that sealing plates 76, 78 do not rotate; this decreases the risk of injury to the user, and simplifies cleaning of drum motor 10. Sealing plates 76, 78 can be made of metal or a suitable plastic.

On its outer side, sealing plate 78 is equipped with two sealing elements 90, e.g. two sealing lips, a radial packing ring, or the like. The inner surface of casing part 14, located opposite sealing elements 90, is ground and polished. To facilitate assembly, hollow frusto-conical segments 92 are provided on the inner side of casing part 14, adjacent the sealing plates.

With the invention, in contrast to drum motors having an internal gear linkage, shaft 18 can be continuous, thus imparting particularly high stability to drum motor 10. Electronically commutated motor 12 does not have a rotatable shaft. The continuous stationary shaft 18 means that two rolling bearings 24, 40 are sufficient. Since casing part 14 is integral with external rotor motor 12, rather than a separate element, the weight of drum motor 10 is correspondingly reduced.

Assembly

Motor magnets 50, spacer 58, and magnet ring 60 are adhesively bonded into casing part 14, optionally with spot-grinding, and then magnetized in a suitable apparatus. Rolling bearing 40 is also installed in recess 44 and secured with snap ring 48.

The stator lamination stack is pressed onto shaft 18, and circuit board 66 is mounted on shaft 18. Ball bearing 24 is then pressed onto shaft 18 at the desired location.

After these preparatory actions, shaft 18, along with the parts installed on it, is inserted with its insertion end (i.e. right end 94 in this case) into the prepared casing part 14 from the left. Insertion is facilitated by the fact that outer race 26 of left ball bearing 24 is axially displaceable in recess 28, to allow it to be axially clamped by spring 30.

In the process, segment 36 of shaft 18 is pressed into inner race 38 of rolling bearing 40, and sensor 62 is slid into the interior of control magnet 60. An important advantage of the invention is that the control electronics (on circuit board 66) are integrated into motor 10.

External connection of motor 10 is accomplished through transverse bore 70 and longitudinal bore 68. To simplify assembly, an electrical plug connector (not depicted) can be provided at the transition from transverse bore 70 to longitudinal bore 68.

Depending on the application, one or more Hall generators or a resolver, a GMR (Giant Magneto Resistor) sensor, an MR sensor, etc. can be used as sensor 62. Sensing of the rotor position using the so-called "sensorless" principle is also not excluded in the context of the invention.

Spring 30 is then introduced and is placed under load and secured by prong ring 32 or another securing element. Lastly, sealing plates 76, 78 are installed. Assembly is thus very simple and time-saving. Shaft 18 can optionally be put together from several parts, but a one-piece construction is preferred. The use of a large-diameter shaft, and bearings with small radial dimensions, yields the advantage that very good heat transfer out from the stator lamination stack 52 via shaft 18 is possible.

An air gap 80, shown in the enlargement in FIG. 2, is located between rotor magnets 50 and lamination stack 54.

Many variants and modifications are of course possible within the scope of the present invention. Although motor 12 is shown as an external rotor motor having a permanent magnet rotor 50, in other embodiments the rotor can nevertheless also be implemented as a short-circuit rotor (having a short-circuit winding), a synchronous motor, a reluctance motor (having a magnetically soft rotor), etc. Since a collectorless motor allows very different rotation speeds to be set without great difficulty, the structure shown is particularly preferred for low rotation speed applications.

Rotor magnets 50 may have a trapezoidal or sinusoidal magnetization depending on the motor principle used, a trapezoidal magnetization being preferred for rotor magnets 50, and a sinusoidal magnetization being preferred for sensor magnets 60.

What is claimed is:

1. An external rotor motor (12), comprising
an internal stator (52);
a stationary support part (18) supporting the stator; and
an external rotor (49), cooperating with the internal stator (52), and mounted on bearings for rotation with respect to the stator, said rotor having a casing part (14) on whose inner side (28) is arranged a permanent-magnet arrangement (50) that coacts with the internal stator (52),
a first side of said casing part (14) being supported by means of a first rolling bearing (24) on said stationary support part (18), said first bearing having an outer race (26) slidably arranged adjacent an inner surface (28) of said casing part (14) and having an inner race (38) fixed to said stationary support part (18);
a second side of said casing part (14) being supported by means of a second rolling bearing (40) on said stationary support part (18), said second bearing having an outer race (42) nonslidably secured adjacent the inner surface (28) of said casing part (14) and having an inner race (38) fixed to said stationary support part (18); and wherein
the outside diameter of the outer race (26) of said first rolling bearing is dimensioned such that the stationary support part (18), along with said internal stator (52) and said first rolling bearing (24) mounted thereon, fits into said casing part (14) for purposes of assembling said motor.

2. The motor of claim 1, further comprising
a shoulder (46), formed on said inner surface of said casing part (14), and a snap ring (48), which together secure in place said outer race (42) of said second rolling bearing (40).

3. The motor of claim 2, further comprising
at least one spring which engages against said slidable outer race (26) of said first rolling bearing (24).

4. The motor of claim 3, further comprising
a prong ring (32) having prongs which engage into the inner surface of said casing part (14).

5. The motor of claim 1, further comprising
at least one spring which engages against said slidable outer race (26) of said first rolling bearing (24).

6. The motor of claim 5, further comprising
a prong ring (32) having prongs which engage into the inner surface of said casing part (14).

7. The motor of claim 1, wherein said first and second rolling bearings differ in size.

8. The motor of claim 1, wherein a sensor arrangement (62, 66), for sensing the rotational position of the external rotor (49) relative to the internal stator (52), is arranged between the first rolling bearing (24) and the internal stator (52) mounted on the support part (18).

9. The motor according to claim 8, wherein the sensor arrangement (62, 66) has, associated with it, a control magnet (60) mounted on the inner side (28) of the casing part (14), the number of whose poles is greater than the number of magnetic poles (50), coacting with the internal stator (52) and secured to the casing part (14), of the external rotor (49).

10. The motor according to claim 9, wherein a nonmagnetic spacer ring (58) is arranged between the magnet poles (58) of the external rotor (49) and the control magnet (60).

11. The motor according to claim 9, wherein the support part (18) has at least one portion (86, 88) of frusto-conical shape on which is mounted at least one closure member (76, 78) which, along with a sealing element (90), engages against the inner surface (28) of said casing part (14).

12. The motor according to claim 11, wherein the closure member (76, 78) has, on its inner periphery, a protrusion (82) that engages into a corresponding recess (84) of the support part (18).

13. The motor according to claim 11, wherein one closure member (76,78) has, in its radially inner region, a resilient portion (80), in order to facilitate assembly onto said stationary support part (18).

14. The motor according to claim 9, wherein said stationary support part (18) has at least one portion (86, 88) of frusto-conical shape, in order to facilitate mounting of the closure element onto the support part (18).

15. The motor according to claim 9, wherein an inner surface (28) of said support part (18) is formed with a frusto-conical portion (92) in order to facilitate assembly of said closure member (76, 78) into said casing part (14).

16. The motor according to claim 9, wherein in order to constitute a magnetic return path for a permanent magnet (50, 60) of the rotor, the casing part (14) is made at least locally of a ferromagnetic material.

17. The motor of claim 1, further comprising means for electronically commutating said motor.

* * * * *